(No Model.)

C. WILKENS.
AMPERE-METER OR VOLTMETER.

No. 509,342. Patented Nov. 21, 1893.

Witnesses
M. C. Pinckney
C. Van Deursen

Inventor:
Carl Wilkens,
By his Attorneys
Bowen & Behrens

THE NATIONAL LITHOGRAPHING COMPANY,
WASHINGTON, D. C.

UNITED STATES PATENT OFFICE.

CARL WILKENS, OF FRANKFORT-ON-THE-MAIN, ASSIGNOR TO HARTMANN & BRAUN, OF BOCKENHEIM, GERMANY.

AMPÈRE-METER OR VOLTMETER.

SPECIFICATION forming part of Letters Patent No. 509,342, dated November 21, 1893.

Application filed July 19, 1893. Serial No. 480,875. (No model.)

*To all whom it may concern:*

Be it known that I, CARL WILKENS, electrical engineer, resident at Frankfort-on-the-Main, Germany, have invented new and useful Improvements in Ampère-Meters and Voltmeters, of which the following is a specification.

The ampère-meters and voltmeters in which the influence of a solenoid on a piece of soft iron is used for measuring the current show a difference in the indications when the measuring is done at increasing current as against when it is done at a decreasing one. The reason of this difference is found in the friction of the iron molecules, the best instruments for practical use being those which show the smallest difference. The manufacturers of these instruments take great pains to reduce the amount of this difference as much as possible; they try to avoid this fault by arranging the movable iron piece in such a way that the direction of its lines of force is not altered when it changes its position.

This invention shows new methods which attain the same object by other essential means.

If soft iron is magnetized the molecules of the iron are directed causing a friction of them against each other; if now the magnetizing force ceases, not all the molecules will return to their original position if the force is not sufficiently strong to overcome the friction of the molecules.

Figure 1:
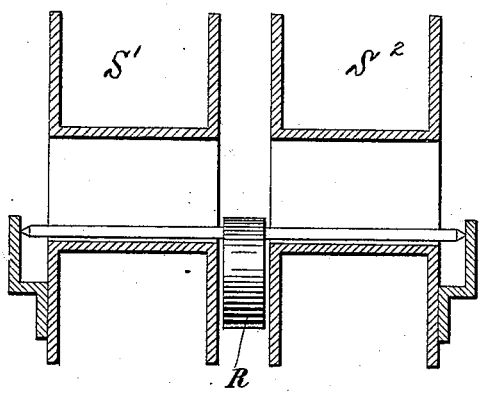
Figure 2:
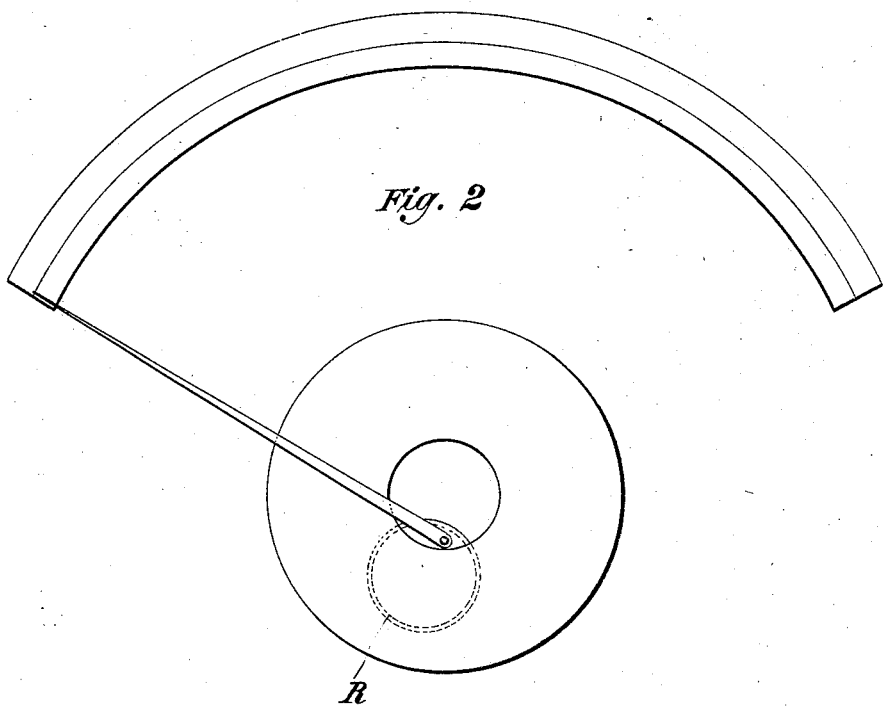

In the ampère-meter or voltmeter forming the subject of this invention and of which the accompanying drawings show a cross section and a front view in Figures 1 and 2 respectively, the force which effects the return is strengthened by using the remanent magnetism.

A ring or cylinder R of soft iron is arranged movable between two solenoids S' and S² which turn opposite poles against each other; the ring or cylinder being eccentric so that in each position its axis remains parallel to the axes of the solenoids and the distance between the two axes tends to become smaller. The arrangement may be made so that the cylinder can perform a revolution of about one hundred and eighty degrees. By the influence of the solenoids the iron cylinder is magnetized in the direction of its axis. The lines of force of the remanent magnetism however are at right angles thereto because the iron cylinder forms a magnetical iron-closed ring and the remanent magnetism will take the way in which it finds the least magnetical resistance. The remanent magnetism tends to direct the molecules of the cylinder at a right angle to the axis and to form a magnet without poles. The consequence will be that in the arrangement shown in Fig. 1 the differences between the directing force of the solenoids and the force of the remanent magnetism are acting together in the molecules of the iron. This circumstance will have the effect that when the magnetizing force is decreasing the return of the molecules is effected not only by their elasticity but that an additional force, that is to say the force of the remanent magnetism, is acting. It is attained in this manner that the differences in the indication of such an instrument at increasing and decreasing currents are reduced to a minimum. The inner space of the solenoid may be covered with fixed iron cylinders to strengthen the force of the solenoids the fixed iron cylinders being exposed to the same magnetical conditions as the movable iron cylinder.

I claim—

In ampère meters and voltmeters the arrangement of an eccentric ring or cylinder between two solenoids so that at the turning of the iron cylinder its axis is moved parallel to the axes of the solenoids whereby the effect of the current in the solenoids will tend to coincide the two axes the object of the arrangement being to employ a closed iron ring or cylinder reducing the nuisible influence of the remanent magnetism and to attain a large deflection of the pointer.

In testimony whereof I have signed my name to this specification in the presence of two subscribing witnesses.

CARL WILKENS.

Witnesses:
ALVESTO S. HOGUE,
JEAN GRUND.